Figure 2:
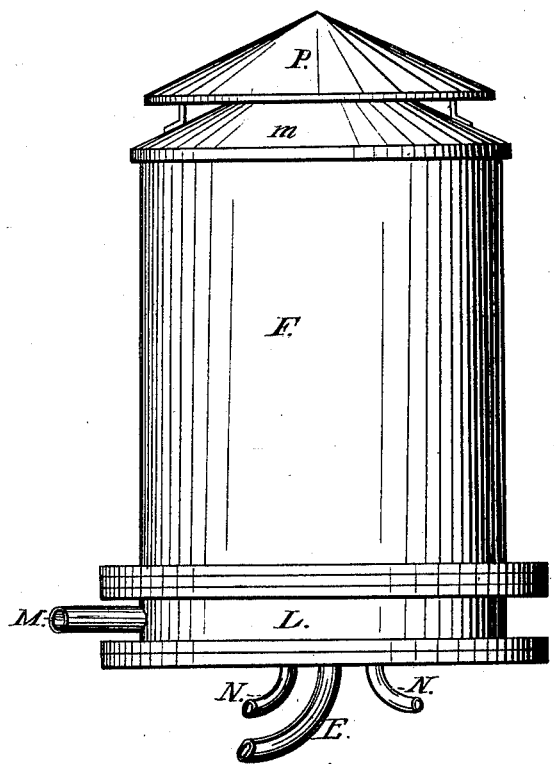
Figure 3:
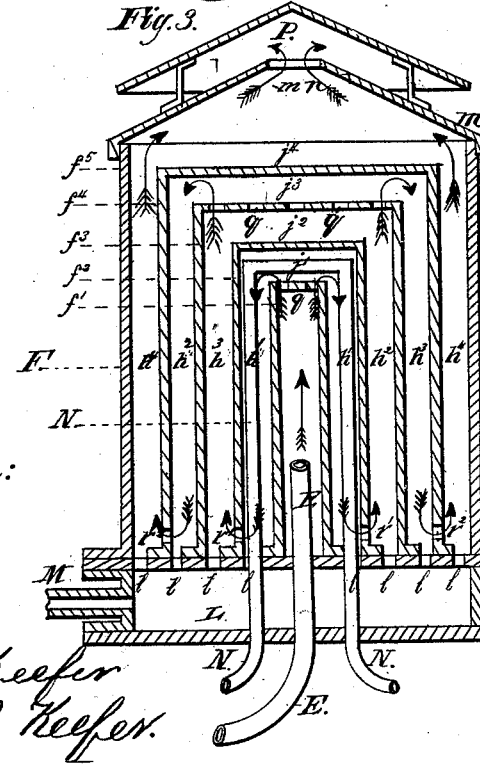
Figure 4:
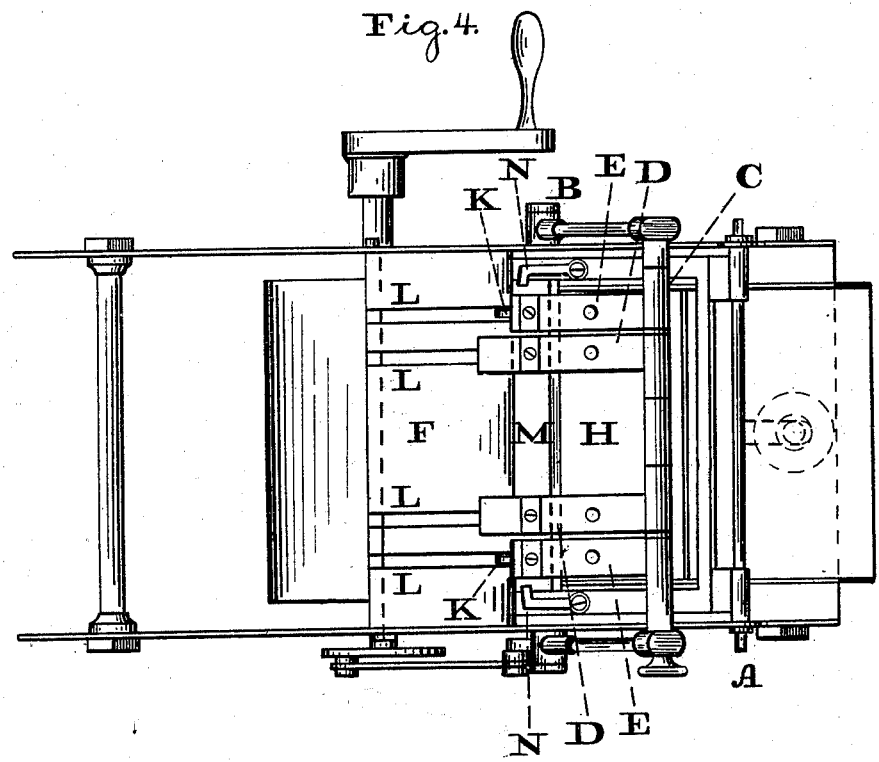
Figure 5:
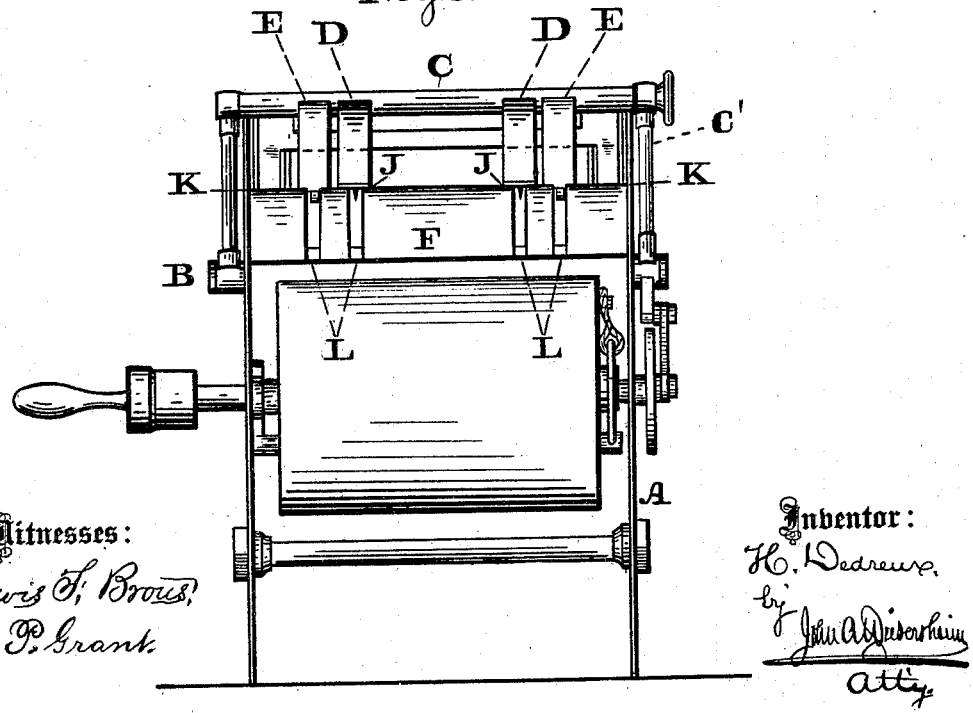

2 Sheets—Sheet 1.
H. DeDREUX.
MACHINES FOR FEEDING SHEETS OF PAPER.
No. 175,826. Patented April 11, 1876.
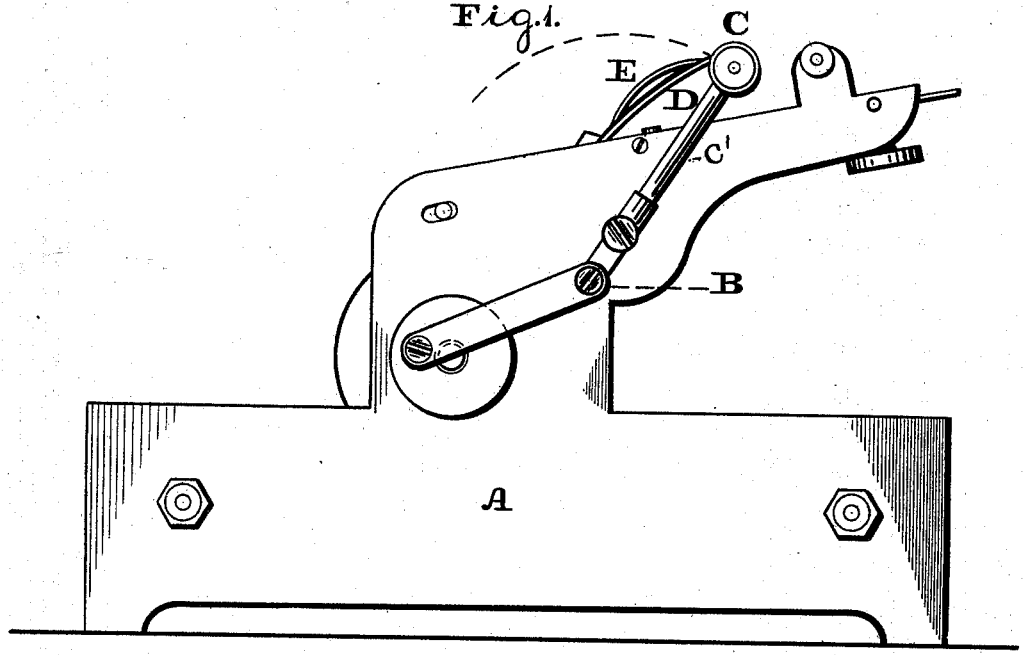
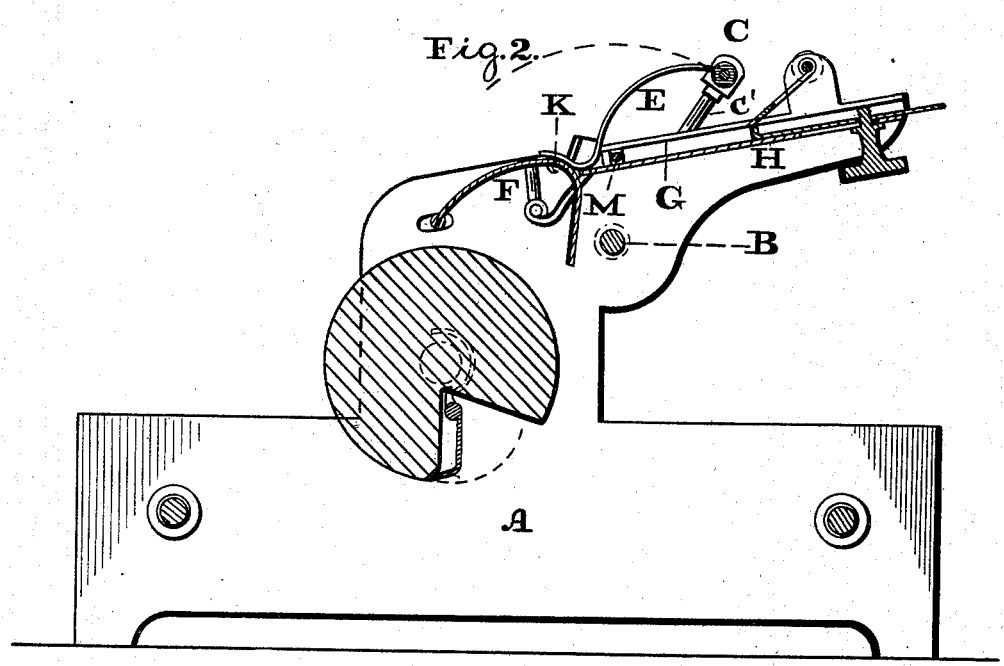
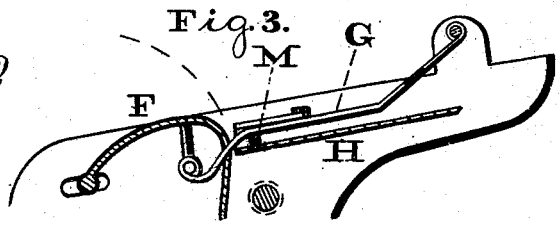
Witnesses:
Lewis F. Brous,
Ao. P. Grant.
Inventor:
H. Dedreux.
by John A. Wiedersheim,
Atty.

2 Sheets—Sheet 2.

W. S., G. H. & J. A. DEEDS.
AIR GAS MACHINE.

No. 175,827. Patented April 11, 1876.

Attest:
Benj S Keefer
Marion B. Keefer

Inventor:
William S. Deeds,
George H. Deeds,
James A. Deeds
William S Deeds
Atty 2 Sheets—Sheet 2.

H. De DREUX.
MACHINES FOR FEEDING SHEETS OF PAPER.

No. 175,826. Patented April 11, 1876.

Witnesses:
Lewis F. Brow
A. P. Grant

Inventor:
H. Dedreux
by Jean A. Wiesenheim
Atty.